(12) United States Patent
Genc et al.

(10) Patent No.: US 12,160,069 B2
(45) Date of Patent: Dec. 3, 2024

(54) COMPRESSION MECHANISMS FOR CABLE SEALING ON CLOSURES

(71) Applicant: Corning Research & Development Corporation, Corning, NY (US)

(72) Inventors: Erol Genc, Berlin (DE); Johann Georg Hajok, Bochum (DE); Wolf Peter Kluwe, Hagen (DE); Jürgen Matthies, Wetter (DE); Thorsten Müller, Menden (DE)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 294 days.

(21) Appl. No.: 17/716,241

(22) Filed: Apr. 8, 2022

(65) Prior Publication Data

US 2022/0329010 A1  Oct. 13, 2022

Related U.S. Application Data

(60) Provisional application No. 63/283,995, filed on Nov. 29, 2021, provisional application No. 63/217,135, (Continued)

(51) Int. Cl.
*H01R 13/629* (2006.01)
*G02B 6/44* (2006.01)
(Continued)

(52) U.S. Cl.
CPC ..... *H01R 13/62961* (2013.01); *H01R 13/521* (2013.01); *H01R 13/6272* (2013.01); *H02G 3/088* (2013.01)

(58) Field of Classification Search
CPC .............. H01R 13/6296; H01R 13/521; H01R 13/6272; H02G 3/088; G02B 6/44775; G02B 6/4444
See application file for complete search history.

(56) References Cited

U.S. PATENT DOCUMENTS

| 4,902,855 A | 2/1990 | Smith |
| 6,046,406 A | 4/2000 | Milanowski et al. |

(Continued)

OTHER PUBLICATIONS

European Patent Application No. 22167652.1 Search Report and Search Opinion dated Sep. 15, 2022; 9 Pages; European Patent Office.

*Primary Examiner* — Hoa C Nguyen
*Assistant Examiner* — Amol H Patel
(74) *Attorney, Agent, or Firm* — Tamika A. Crawl-Bey

(57) ABSTRACT

A lever mechanism for sealing a telecommunications closure includes a plurality of hinge elements; a leveraging element extending upwardly from each hinge element; an arm section extending from the leveraging element; a biasing element downwardly extending from the arm section; and a handle coupled to the biasing element such that upon application of a compressive force to at least a portion of the handle, each hinge element, each leveraging element, each arm section, and each biasing element moves, allowing the lever mechanism to change from a non-actuated position to an actuated position. The lever mechanism is further configured to couple with a spring-activated element and environmentally seal the telecommunications closure.

7 Claims, 20 Drawing Sheets

Related U.S. Application Data filed on Jun. 30, 2021, provisional application No. 63/174,517, filed on Apr. 13, 2021.

(51) Int. Cl.
  *H01R 13/52* (2006.01)
  *H01R 13/627* (2006.01)
  *H02G 3/08* (2006.01)

(56) References Cited

U.S. PATENT DOCUMENTS

| | | |
|---|---|---|
| 9,250,407 B2 | 2/2016 | Vastmans et al. |
| 9,400,363 B2 | 7/2016 | Coenegracht et al. |
| 9,502,878 B2 | 11/2016 | Coenegracht et al. |
| 9,512,920 B2 | 12/2016 | Vastmans et al. |
| 9,632,268 B2 | 4/2017 | Coenegracht et al. |
| 9,647,437 B2 | 5/2017 | Aznag et al. |
| 9,685,776 B2 | 6/2017 | Coenegracht et al. |
| 9,753,237 B2 | 9/2017 | Coenegracht |
| 9,948,082 B2 | 4/2018 | Coenegracht et al. |
| 10,084,302 B2 | 9/2018 | Coenegracht et al. |
| 10,208,859 B2 | 2/2019 | Vastmans et al. |
| 10,393,978 B2 | 8/2019 | Coenegracht |
| 10,411,455 B2 | 9/2019 | Coenegracht et al. |
| 10,680,426 B2 | 6/2020 | Coenegracht et al. |
| 10,951,017 B2 | 3/2021 | Coenegracht et al. |
| 10,996,414 B1 | 5/2021 | Kimbrell et al. |
| 2013/0320631 A1* | 12/2013 | Vastmans ............. G02B 6/4444 277/616 |
| 2015/0071598 A1* | 3/2015 | Badura .............. G02B 6/44775 385/135 |
| 2015/0137461 A1* | 5/2015 | Coenegracht ........ G02B 6/4444 277/618 |
| 2017/0329095 A1 | 11/2017 | Coenegracht |
| 2020/0249407 A1 | 8/2020 | Aznag et al. |
| 2020/0389007 A1 | 12/2020 | Coenegracht et al. |
| 2021/0072481 A1 | 3/2021 | Wittmeier et al. |
| 2021/0294054 A1 | 9/2021 | Kimbrell et al. |
| 2021/0313789 A1 | 10/2021 | Coenegracht et al. |

\* cited by examiner

COMPRESSION MECHANISMS FOR CABLE SEALING ON CLOSURES

CROSS-REFERENCE TO RELATED APPLICATIONS

This application claims the benefit of priority to U.S. Provisional Application Ser. No. 63/174,517, filed Apr. 13, 2021, U.S. Provisional Application Ser. No. 63/217,135, filed Jun. 30, 2021, and U.S. Provisional Application Ser. No. 63/283,995, filed Nov. 29, 2021. The contents of each aforementioned priority applications are relied upon and incorporated herein by reference in their entireties.

BACKGROUND

The present disclosure generally relates to compression mechanisms used to compress and activate seals on cable sealing segments, particularly for environmental protection (e.g. pressure and water tightness) of sealing systems and closures.

Telecommunications systems include various networks, subsystems and components that allow for the transmission of data and voice signals over long distances. Telecommunications cables and closures (also referred to in the telecommunications industry as closures) make up part of these networks and subsystems. Telecommunications cables include, but are not limited to fiber optic cables, copper cables, or combinations of copper and fiber optic cables. Telecommunications closures house and protect telecommunications components such as splices, termination panels, power splitters and wavelength division multiplexers.

Telecommunications closures are typically sealed to protect components inside of the closure from environmental exposure. For example, telecommunications are designed inhibit the intrusion of moisture, bugs, and other types of contaminants. While some types of sealing systems for telecommunications closures are effective, there is still a need for improvements in this area.

SUMMARY

Disclosed herein are various embodiments of lever mechanisms, sealing systems, sealing activation tools, and closures having lever mechanisms.

According to a first aspect, a lever mechanism for sealing a telecommunications closure includes a plurality of hinge elements; a leveraging element extending upwardly from each hinge element; an arm section extending from the leveraging element; a biasing element downwardly extending from the arm section; and a handle coupled to the biasing element such that upon application of a compressive force to at least a portion of the handle, each hinge element, each leveraging element, each arm section, and each biasing element moves, allowing the lever mechanism to change from a non-actuated position to an actuated position, wherein in the actuated position, the lever mechanism is configured to couple with a spring-activated element and environmentally seal the telecommunications closure.

According to additional aspects, each hinge element is configured as an insertable male-type hinge element configured for insertion into a complementary female-type receiving element disposed on the telecommunications closure; and the leveraging element curves upwardly and downwardly to form a c-shape.

According to another aspect of the disclosure, a sealing system for a telecommunications closure includes a lever mechanism, comprising a plurality of hinge elements; a leveraging element extending upwardly from each hinge element; an arm section extending from the leveraging element; a biasing element downwardly extending from the arm section; and a handle coupled to the biasing element such that upon application of a compressive force to at least a portion of the handle, each hinge element, each leveraging element, each arm section, and each biasing element moves, allowing the lever mechanism to change from a non-actuated position to an actuated position, wherein in the actuated position, the lever mechanism is configured to couple with a spring-activated element and environmentally seal the telecommunications closure; and a sealing spring coupled to the lever mechanism.

According to another aspect of the disclosure, a telecommunications closure, includes a sealing system positionable onto a closure section for sealing around a communications cable, the sealing system comprising a lever mechanism that is actuated to apply a force to a sealing seal, wherein the lever mechanism is movable between an actuated position and a non-actuated position. The lever mechanism includes a plurality of hinge elements; a leveraging element extending upwardly from each hinge element; an arm section extending from the leveraging element; a biasing element downwardly extending from the arm section; and a handle coupled to the biasing element such that upon application of a compressive force to at least a portion of the handle, each hinge element, each leveraging element, each arm section, and each biasing element moves, allowing the lever mechanism to change from a non-actuated position to an actuated position, wherein in the actuated position, the lever mechanism is configured to couple with a spring-activated element and environmentally seal the telecommunications closure.

According to additional aspects, the lever mechanism is configured to engage with the sealing seal when the lever mechanism moves between the actuated position and the non-actuated position, the lever mechanism and the sealing seal are pivotal between the actuated position and the non-actuated position, the sealing seal includes a pre-loaded spring; the lever mechanism includes a portion or that applies a force to the sealing seal such that the pre-loaded spring is activated; the lever mechanism has a stroke length less than 20 millimeters; the lever mechanism has a stroke length less than 10 millimeters; the lever mechanism includes a plurality of hinge points that engage with the sealing spring; contained within the closure is an activation tool configured to apply a compressive force to the lever mechanism; and the sealing systems, including the lever mechanisms, the sealing spring, and the activation tool disclosed herein are configured to be contained in various types of closures, including, but not limited to dome closures.

Additional aspects, features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

BRIEF DESCRIPTION OF THE DRAWINGS

The figures are not necessarily to scale. Like numbers used in the figures may be used to refer to like components. However, it will be understood that the use of a number to refer to a component in a given figure is not intended to limit the component in another figure labeled with the same number.

DETAILED DESCRIPTION

Various exemplary embodiments of the disclosure will now be described with particular reference to the drawings. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the features and limitations set forth in the claims and any equivalents thereof.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

Cartesian coordinates are used in some of the Figures for reference and are not intended to be limiting as to direction or orientation.

For purposes of description herein, the terms "upper," "lower," "right," "left," "rear," "front," "vertical," "horizontal," "top," "bottom," "side," and derivatives thereof, shall relate to the disclosure as oriented with respect to the Cartesian coordinates in the corresponding Figure, unless stated otherwise. However, it is to be understood that the disclosure may assume various alternative orientations, except where expressly specified to the contrary.

For the purposes of describing and defining the subject matter of the disclosure it is noted that the terms "substantially" and "generally" may be utilized herein to represent the inherent degree of uncertainty that may be attributed to any quantitative comparison, value, measurement, or other representation.

Figure 1:
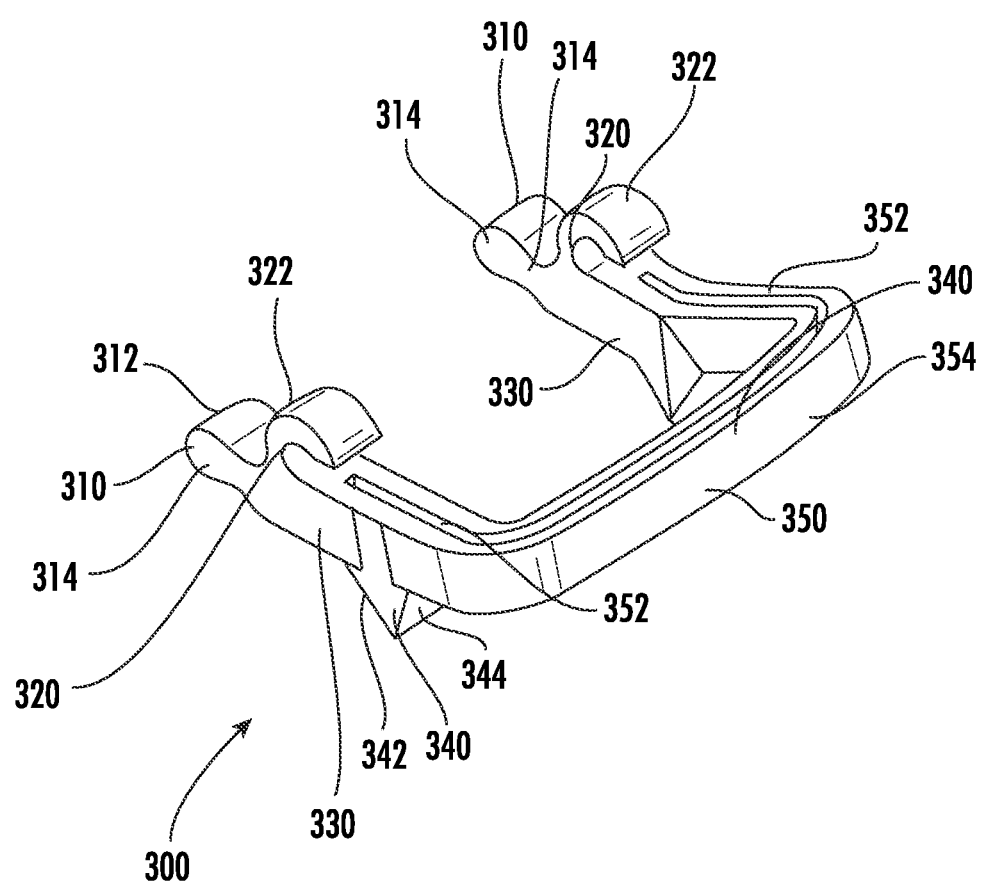
FIG. 1 is an isometric view of a lever mechanism embodiment in accordance with embodiments disclosed herein.

FIG. 1 shows a first embodiment of a lever mechanism 300, which can be integrated into various types of sealing systems and telecommunications closures. The lever mechanism 300 includes a plurality of hinge elements 310, a plurality of leveraging elements 320, a plurality of arm sections 330, a plurality of biasing elements 340, and a handle 350. Each hinge element 310 is used to mount the lever mechanism 300 onto a complementary component of closure. Such a component may be configured as an end cap or a central base plate of a closure. In this version of the lever mechanism, each hinge element 310 is configured as an insertable male-type hinge element, which is insertable into a complementary female-type receiving element, as will be further described with respect to FIG. 3.

Each hinge element 310 preferably has a cantilevered hinge end 312, which is rounded and a hinge extension 314. The hinge extension 314 is preferably integral with or joined to a leveraging element 320, which extends upwardly and curves downwardly to form a c-shape. The leveraging element 320 is integral with an arm section 330 of the lever mechanism 300. The leveraging element has at least one leveraging element surface 322 capable of sustaining application of a force by another component, as will be further described with reference to FIGS. 3 and 4. Each arm section 330 extends laterally away from the leveraging element 320. A biasing element 340 is coupled to each arm and extends downwardly away from the arm section 330. Each biasing element 340 includes at least two biasing surfaces 342, 344. The handle 350 includes at least two handle sections 352 and a handle bridge 354 that connects the two handle sections 352. Each handle section 352 extends upwardly at a pre-determined angle to facilitate application of the compressive force onto the handle bridge 354.

The shape of the lever mechanism 300 is designed such that a force can be applied to activate the lever mechanism and bias each biasing element 340 against a complementary element positioned on a telecommunications closure. The particular geometry of the lever mechanism 300, shown in FIG. 1, has been chosen to apply the force needed to compress the lever mechanism and environmentally seal the closure.

Figure 2:
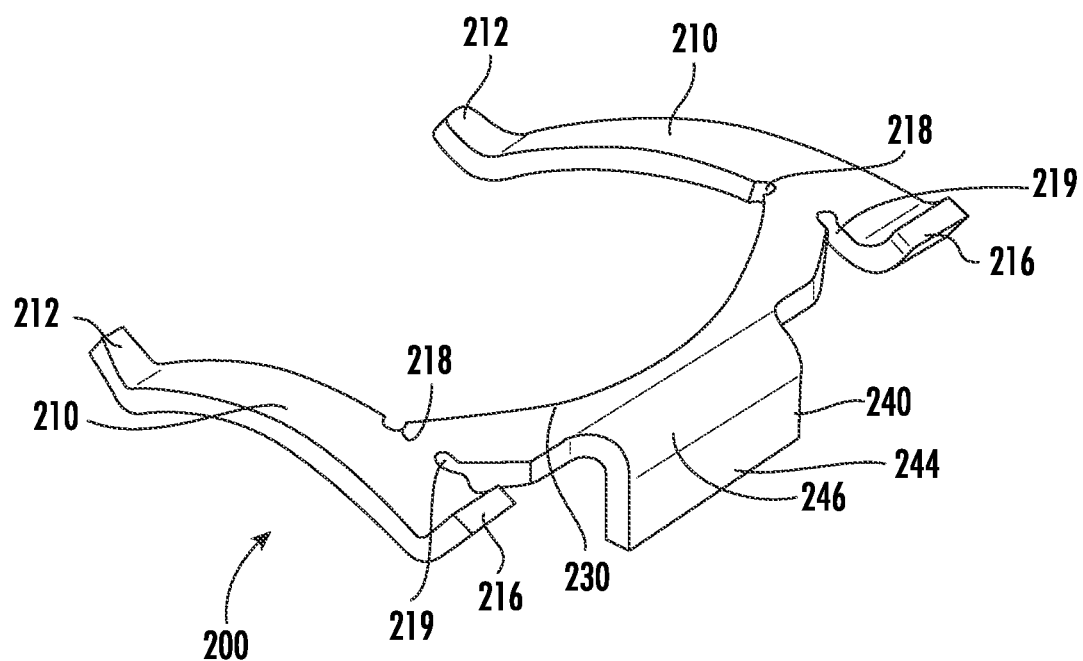
FIG. 2 is an isometric view of a sealing spring in accordance with embodiments disclosed herein.
Figure 3:
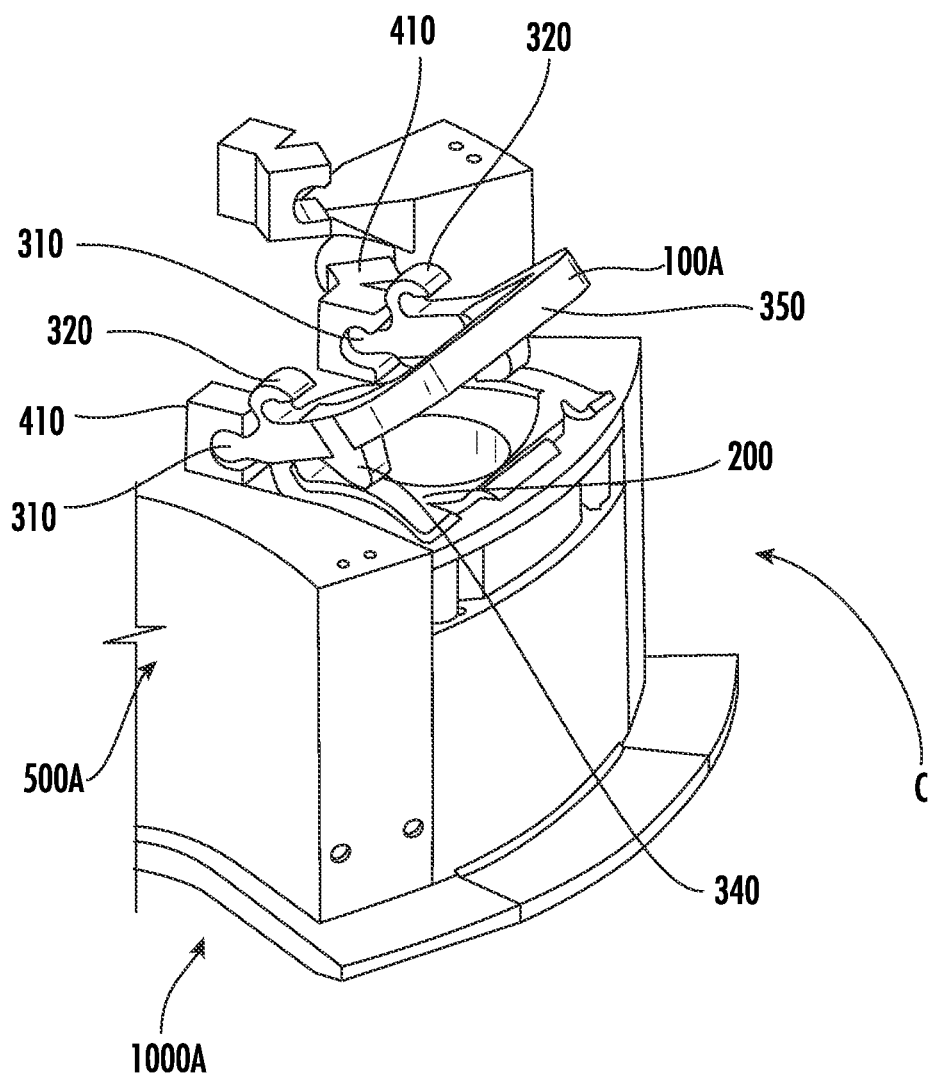
FIGS. 3 and 4 are isometric views of a portion of a closure, including the lever mechanism and sealing spring embodiments shown in FIGS. 1 and 2.
Figure 4:
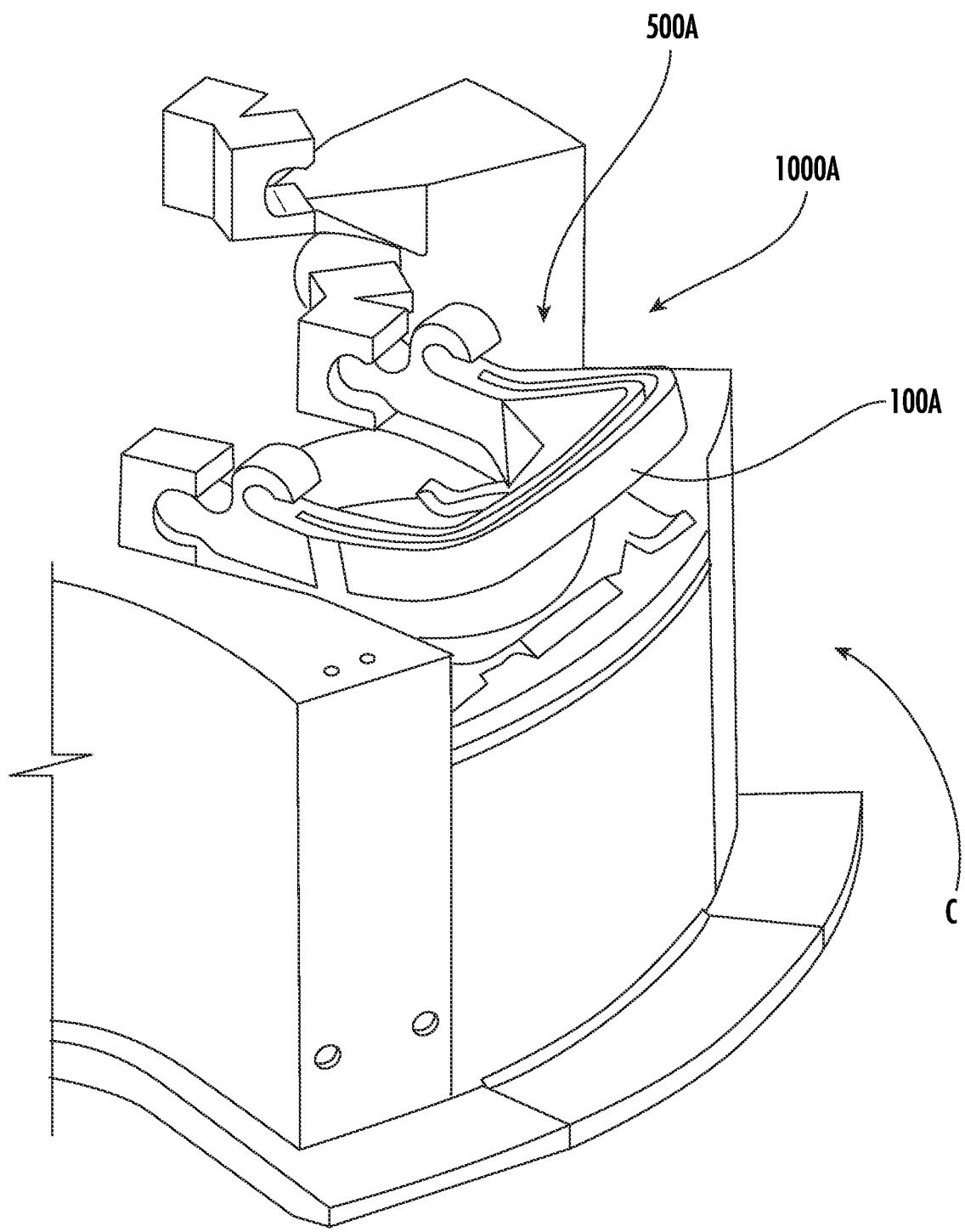

FIG. 2 shows a sealing spring 200 configured for attachment to the lever mechanism 300 and a closure section C (FIGS. 3 and 4). The sealing spring 200 includes a plurality of spring arms 210 having upwardly curved spring arm sections 212, 216 with a defined curvature. To facilitate elastic performance, the sealing spring 200 may include a series of notches at various locations along the inner and outer peripheries of the sealing spring 200. Connecting the spring arms 210 is a spring bridge 230, having an arc-shaped inner periphery 232 and a sealing bridge edge 234. Extending from a central area of the sealing bridge edge is a closure connection member 240. The closure connection member 240 includes a downwardly curved connection element 244, having a curved connection section 246.

FIGS. 3 and 4 shows a partially-assembled section of a telecommunications closure 1000A having a sealing system 500A, which includes the lever mechanism 300, installed on the closure section C, and the sealing spring 200. FIG. 3 shows the sealing system 500A in a non-actuated position and FIG. 4 shows the sealing system 500A in an actuated position.

Figure 5:
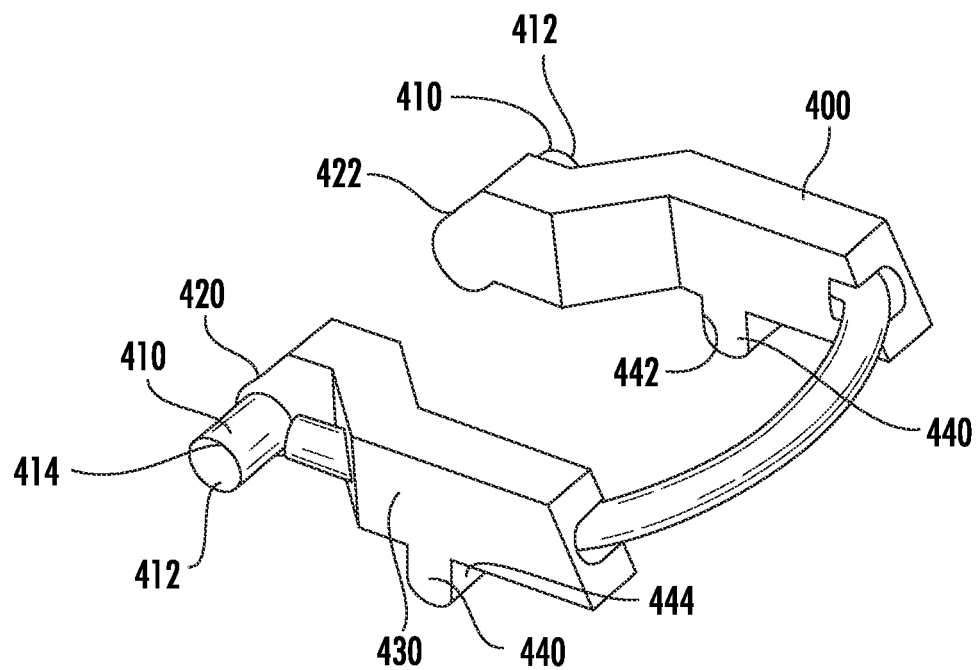
FIGS. 5 and 6 are isometric views of another lever mechanism embodiment.
Figure 6:
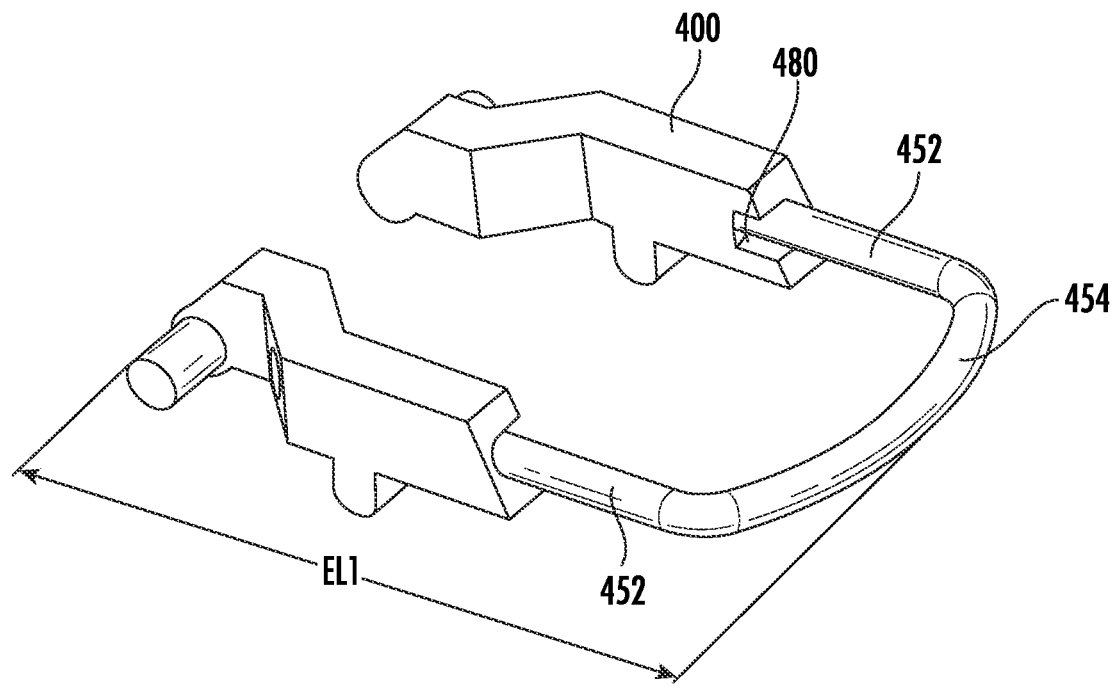

FIGS. 5 and 6 show another embodiment of a lever mechanism 400. This type of lever mechanism configured to move with arm channel 480. The lever mechanism 400 includes a slidable extension arm 450, which reduces the compressive force that has to be applied to achieve an environmental seal. A section of the arm channel 480 is contained within the extension arm 450. In this configuration, the extension arm is a separate component which is removable from the lever mechanism 400. In other configurations, however, the extension arm 450 can be fixed to the lever mechanism 400. The extension is configured to slide out of an arm channel in the lever mechanism such that the lever mechanism 400 has an increased lever mechanism arm length EL1.

The lever mechanism 400 includes a plurality of hinge elements 410, a plurality of leveraging elements 420, a plurality of arm sections 430, a plurality of biasing elements 440, and the extension arm 450. Each hinge element 410 is used to mount the lever mechanism 400 onto a complementary component of closure. Such as component may be configured as an end cap or a central base plate of a closure. In this version of the lever mechanism 400, each hinge element 410 is also configured as an insertable male-type hinge element, which is insertable into a complementary female-type receiving element.

Each hinge element 410 preferably has a cantilevered hinge end 412, which is flat and a hinge extension 414. The hinge extension 414 is preferably integral with or joined to a leveraging element 420, which extends upwardly and curves downwardly to form a c-shape. The leveraging element 420 is integral with an arm section 430 of the lever mechanism 400. The leveraging element has at least one leveraging element surface 422 capable of sustaining application of a force by another component. Each arm section 430 extends laterally away from the leveraging element 420. A biasing element 440 is coupled to each arm and extends downwardly away from the arm section 430. Each biasing element 440 includes at least two biasing surfaces 442, 444. The extension arm 450 includes at least two arm sections 452 and an arm bridge 454 that connects the two arm sections 452. Each arm section 452 extends laterally to facilitate application of the compressive force onto the arm bridge 454.

The shape of the lever mechanism 400 is designed such that a force can be applied to activate the lever mechanism and bias each biasing element 440 against a complementary element positioned on a telecommunications closure. The particular geometry of the lever mechanism 400, shown in FIG. 1, has been chosen to apply the force needed to compress the lever mechanism and environmentally seal the closure.

Figure 7:
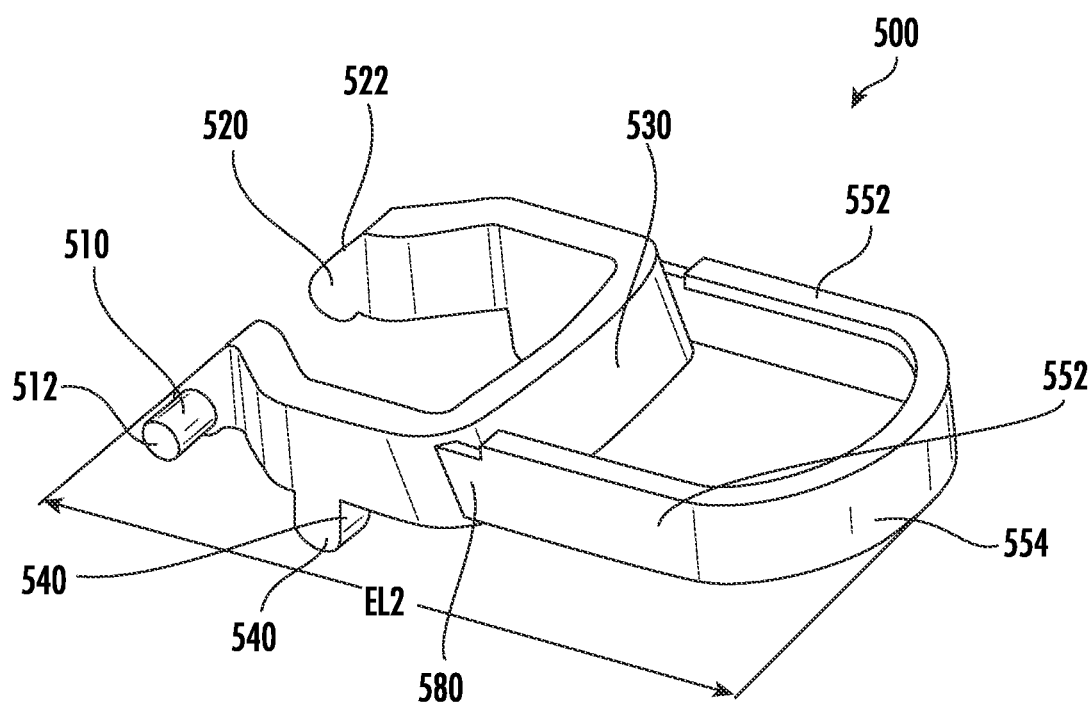
FIGS. 7 and 8 are isometric views of another lever mechanism embodiment.
Figure 8:
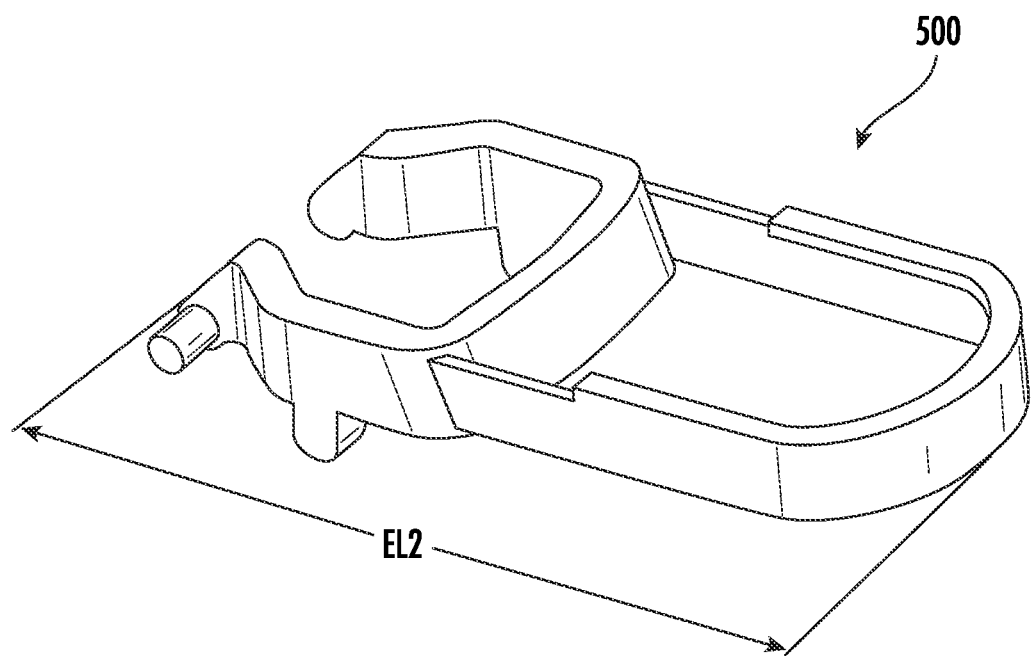

FIGS. 7 and 8 show another embodiment of a lever mechanism 500. This type of lever mechanism contains a slide out extension arm 550 to reduce the compressive force for achieving an environmental seal. In preferred configurations, the extension arm 550 is fixed with the lever mechanism 500. The extension arm 550 is configured to move slide out of an interior channel 580 in the lever mechanism such that the lever mechanism 500 has an increased lever mechanism arm length EL2.

In this configuration, the extension arm is a separate component which is removable from the lever mechanism 500. In other configurations, however, the extension arm 550 can be fixed to the lever mechanism 500. The extension is configured to slide out of an arm channel in the lever mechanism such that the lever mechanism 500 has an increased lever mechanism arm length EL1.

The lever mechanism 500 includes a plurality of hinge elements 510, a plurality of leveraging elements 520, a plurality of arm sections 530, a plurality of biasing elements 540, and the extension arm 550. Each hinge element 510 is used to mount the lever mechanism 500 onto a complementary component of closure. Such a component may be configured as an end cap or a central base plate of a closure. In this version of the lever mechanism 500, each hinge element 510 is also configured as an insertable male-type hinge element, which is insertable into a complementary female-type receiving element.

Each hinge element 510 preferably has a cantilever mechanism hinge end 512, which is flat and a hinge extension 514. The hinge extension 514 is preferably integral with or joined to a leveraging element 520, which extends upwardly and curves downwardly to form a c-shape. The leveraging element 520 is integral with an arm section 530 of the lever mechanism 500. The leveraging element has at least one leveraging element surface 522 capable of sustaining application of a force by another component. Each arm section 530 extends laterally away from the leveraging element 520. A biasing element 540 is coupled to each arm and extends downwardly away from the arm section 530.

Each biasing element 540 includes at least two biasing surfaces 542, 544. The extension arm 550 includes at least two arm sections 552 and an arm bridge 554 that connects the two arm sections 552. Each arm section 552 extends laterally to facilitate application of the compressive force onto the arm bridge 554.

The shape of the lever mechanism 500 is designed such that a force can be applied to activate the lever mechanism and bias each biasing element 540 against a complementary element positioned on a telecommunications closure. The particular geometry of the lever mechanism 500, shown in FIGS. 7 and 8, has been chosen to apply the force needed to compress the lever mechanism and environmentally seal the closure.

Figure 9:
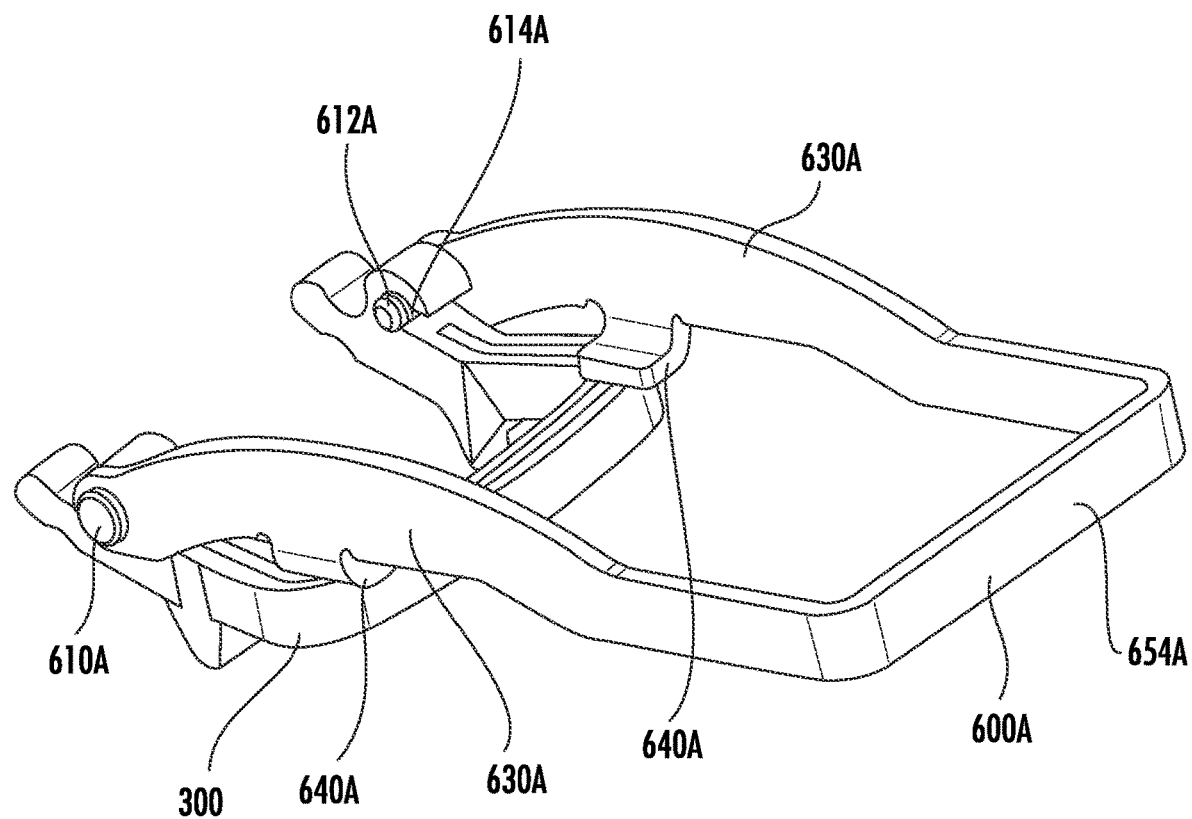
FIG. 9 is an isometric view of a lever mechanism, including an activation tool.

FIG. 9 shows a first embodiment of an activation tool 600A for the lever mechanism 300. The activation tool 600A is configured to grasp into the specific shape and configuration of the lever mechanism 300. The activation tool 600A is further configured to supports an apply force to the cable seal.

The activation tool 600A includes a plurality of hinge elements 610A, a plurality of tool arm sections 630A, a plurality of biasing elements 640A, and a tool arm 650A. Each hinge element 610A is used to mount the activation tool 600A onto a complementary component of the lever mechanism 300. Such as component may be configured as an end cap or a central base plate of a closure. In this version of the activation tool 600A, each hinge element 610A is also configured as an insertable male-type hinge element, which is insertable into a complementary female-type receiving element.

Each hinge element 610A preferably has a cantilever mechanism hinge end 612A, which is flat and a hinge extension 614A. A biasing element 640A is coupled to each arm and curves toward from the tool arm section 630A. Each biasing element 640A includes at least two biasing surfaces 642A, 644A. The tool arm 650A includes at least two arm sections 652A and a tool arm bridge 654A that connects the two arm sections 652A. Each two arm section 652A extends laterally to facilitate application of the compressive force onto the tool arm bridge 654A.

Figure 10:
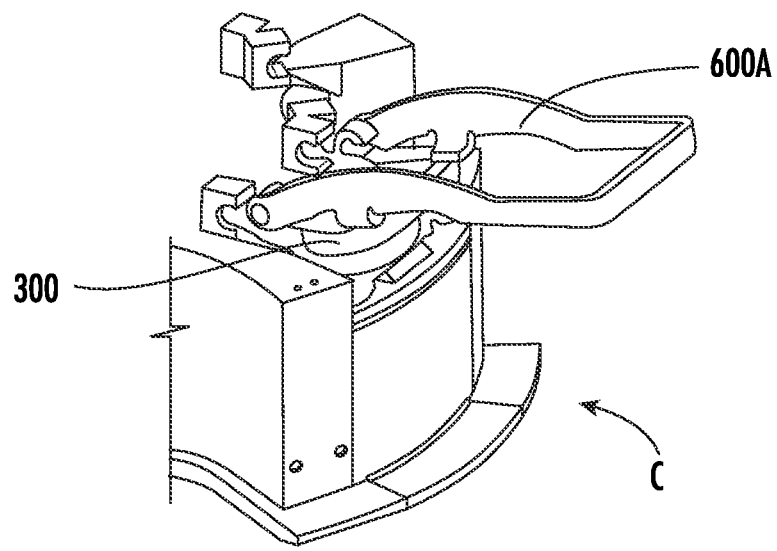
FIGS. 10 and 11 are isometric views of a portion of a closure, including the lever mechanism and sealing spring embodiments shown in FIGS. 1 and 2, and the activation tool shown in FIG. 9.
Figure 11:
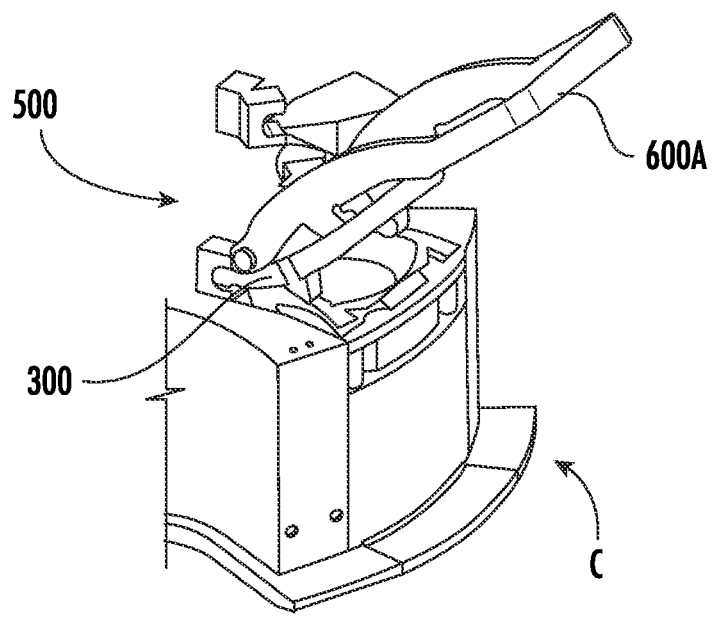

The shape of the activation tool 600A is designed such that a force can be applied to activate the lever mechanism and bias each biasing element 640A against a complementary element positioned on a telecommunications closure. The particular geometry of the activation tool 600A, shown in FIG. 9, has been chosen to apply the force needed to compress the lever mechanism and assure environmental sealing of the sealing system of the closure. FIGS. 10 and 11 show additional detail, relating to the activation tool 600A as used in the sealing system 500A of the closure 1000A.

Figure 12:
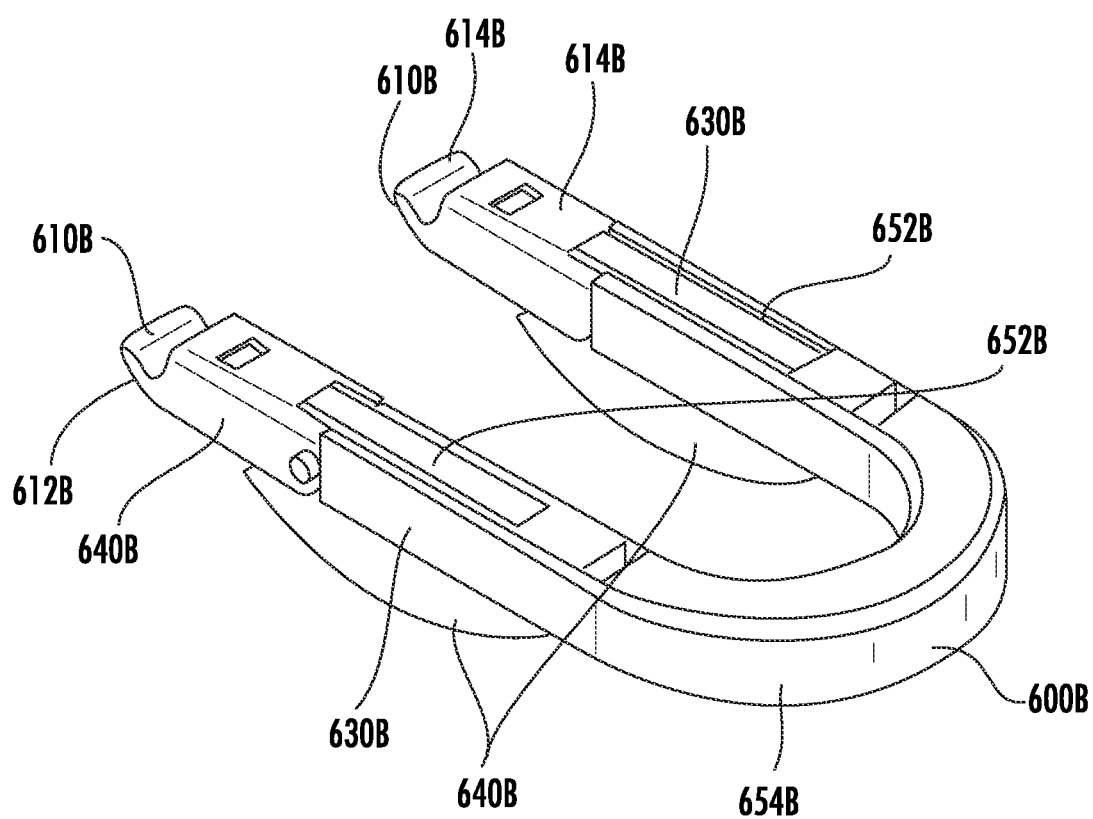
FIGS. 12-14 show various views of another embodiment of an activation tool.
Figure 13:
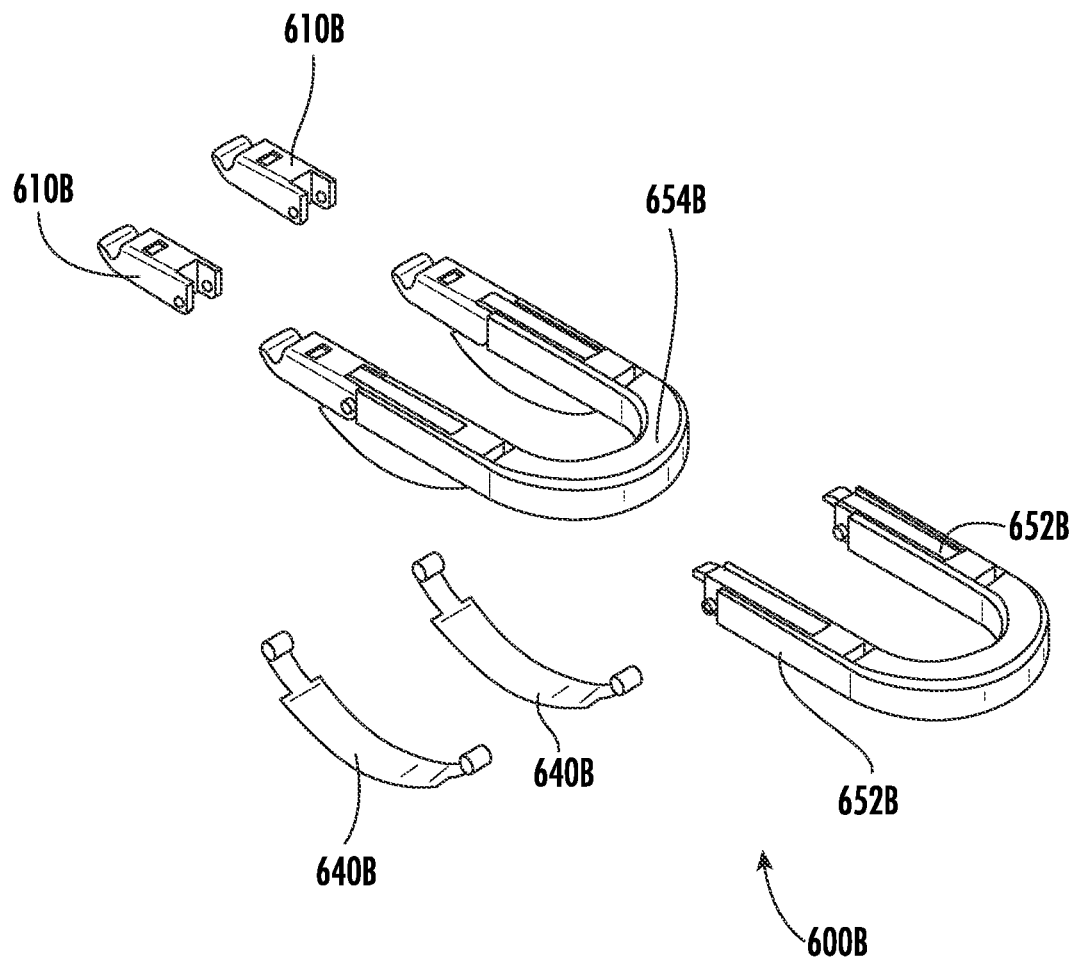

FIGS. 12 and 13 show another embodiment of an activation tool 600B. The tool includes various connection pieces, that allow for connection to the embodiments of the lever mechanisms, shown and described herein. The activation tool 600B is configured to grasp into the specific shape and configuration of the lever mechanism 300. The activation tool 600B is further configured to supports an apply force to the cable seal.

The activation tool 600B includes a plurality of hinge elements 610B, a plurality of tool arm sections 630B, a plurality of biasing elements 640B, and a tool arm 650B. Each hinge element 610B is used to mount the activation tool 600B onto a complementary component of the lever mechanism 300. Such as component may be configured as an end cap or a central base plate of a closure. In this version of the activation tool 600B, each hinge element 610B is also configured as an insertable male-type hinge element, which is insertable into a complementary female-type receiving element.

Each hinge element 610B preferably has a cantilever mechanism hinge end 612B, which is flat and a hinge extension 614B. A biasing element 640B is coupled to each arm and curves toward from the tool arm section 630B. Each biasing element 640B includes at least two biasing surfaces 642B, 644B. The tool arm 650B includes at least two arm sections 652B and a tool arm bridge 654B that connects the two arm sections 652B. Each two arm section 652B extends laterally to facilitate application of the compressive force onto the tool arm bridge 654B.

The shape of the activation tool 600B is designed such that a force can be applied to activate the lever mechanism and bias each biasing element 640B against a complementary element positioned on a telecommunications closure. The particular geometry of the activation tool 600B, shown in FIG. 9, has been chosen to apply the force needed to compress the lever mechanism and assure environmental sealing of the sealing system of the closure.

Figure 14:
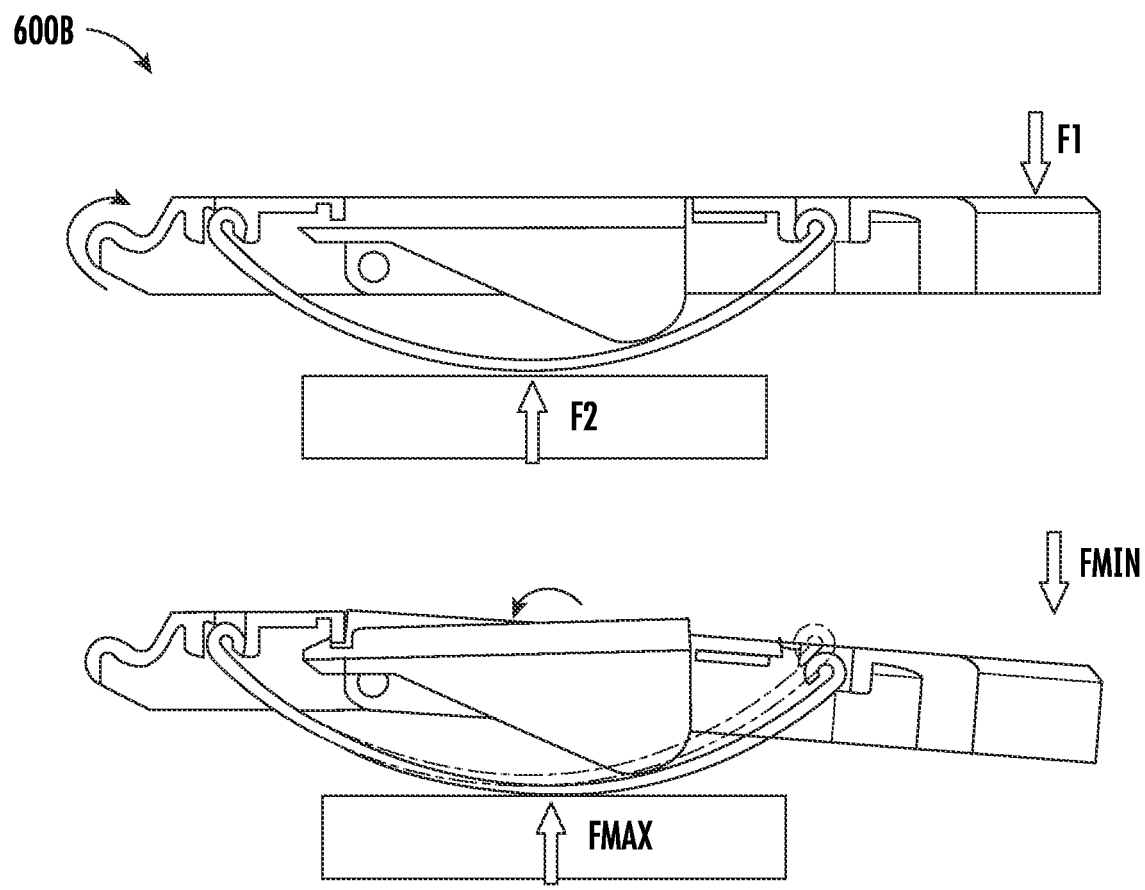

FIG. 14 shows the one of the principle functions of the activation tool 600B. The activation tool 600B is designed such that the activation tool itself applies forces on a lever mechanism such that the tool 600B will release or open when a pre-determined force has been applied or a pre-determined force level has been reached.

Figures 15, 16:
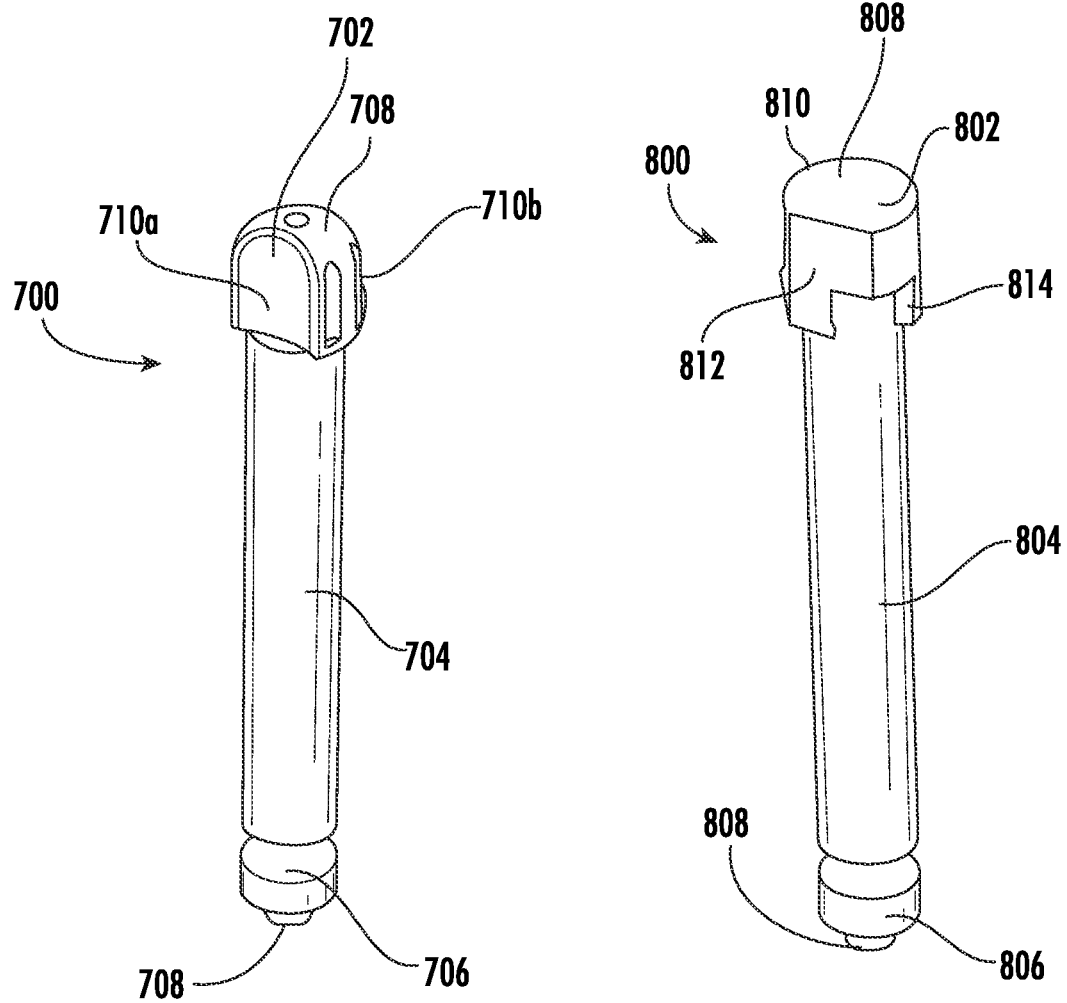
FIG. 15 shows a first embodiment of a locking bolt in accordance with embodiments disclosed herein.
FIG. 16 shows a second embodiment of a locking bolt in accordance with embodiments disclosed herein.

FIGS. 15 and 16 show different versions of locking bolts 700, 800 configured for installation into a closure section C. Each version of the locking bolt serves multiple functions. For example, one type of functionality is to secure the outer cable entry segment into the main end cap. Each locking bolt 700, 800 includes bolt ends 702, 706, 802, 806 and an intermediate bolt body 704, 804. The first bolt ends 702, 802 have slightly different configurations, which may depend in part on installation methods, e.g. the ability to grip the bolt. The overall structure of the locking bolt should not be construed as limiting. Bolt end 702 has an arc-shaped head 708 and two flat head sections 710a, 710b. Bolt end 802 includes a rounded head, having a flat head 808, a rounded periphery 810 with a flat head area 812, and a notched area 814.

Figure 17:
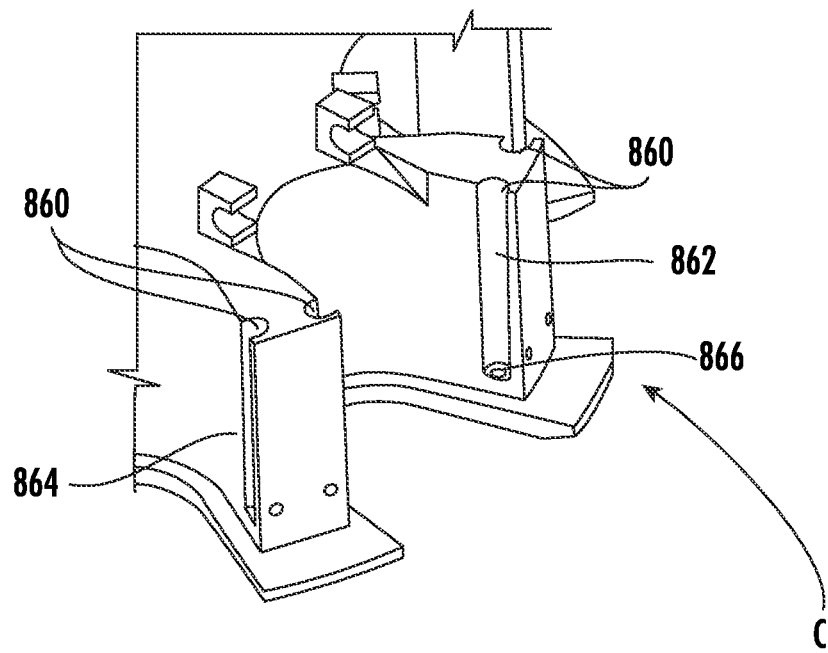
FIG. 17 shows a portion of a closure having channels for positioning of the locking bolts shown in FIGS. 15 and 16 in accordance with embodiments disclosed herein.
Figure 18:
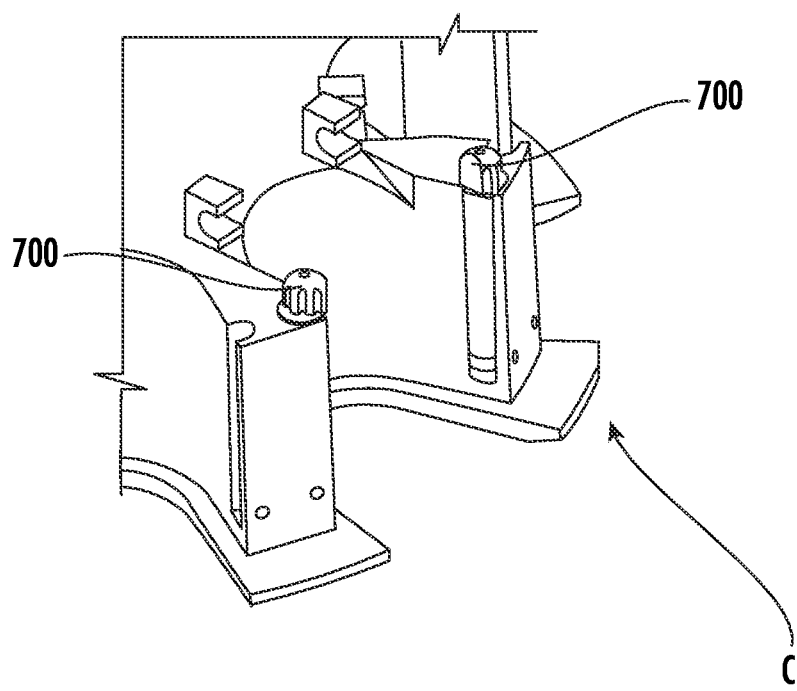
FIGS. 18 and 19 show a portion of a closure having the locking bolt shown in shown in FIG. 15 in accordance with embodiments disclosed herein.
Figure 19:
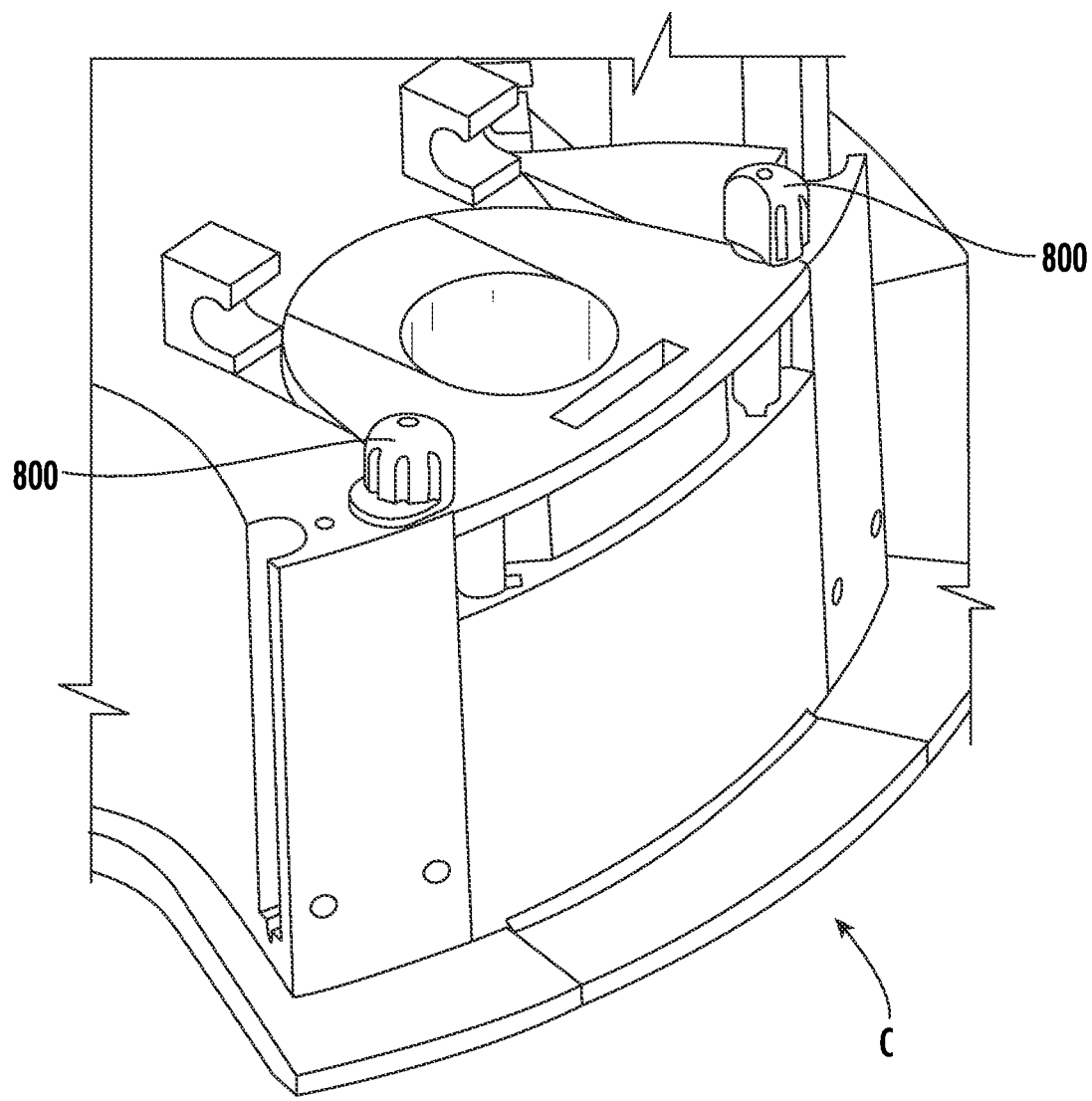
Figure 20:
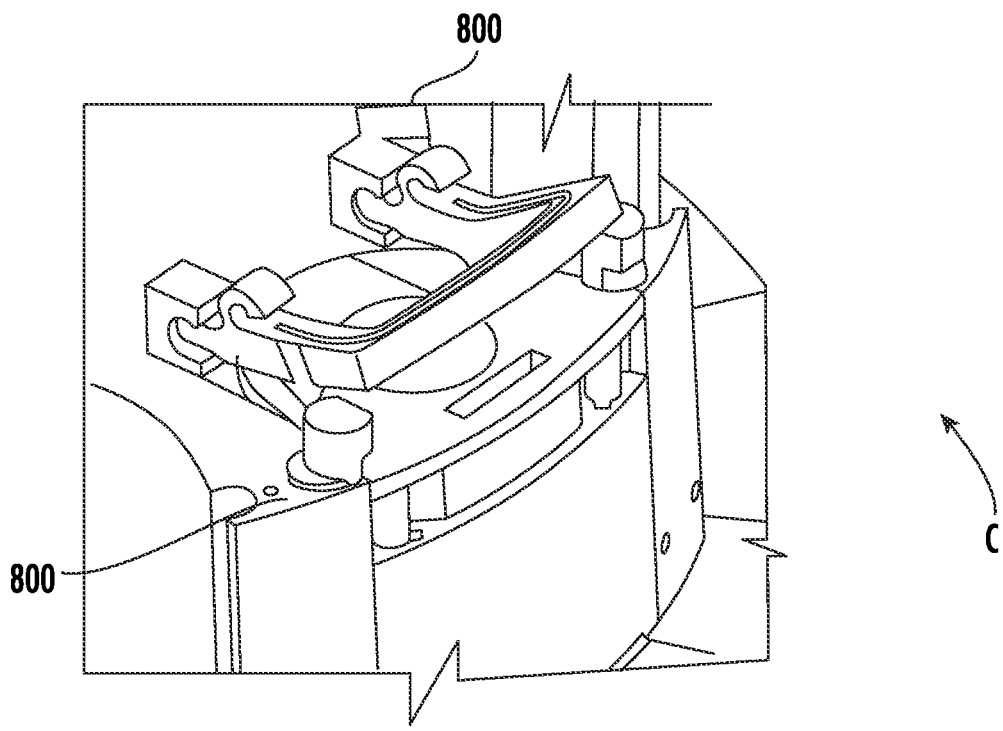
FIGS. 20 and 21 show a portion of a closure having the locking bolt shown in FIG. 16 in accordance with embodiments disclosed herein.
Figure 21:
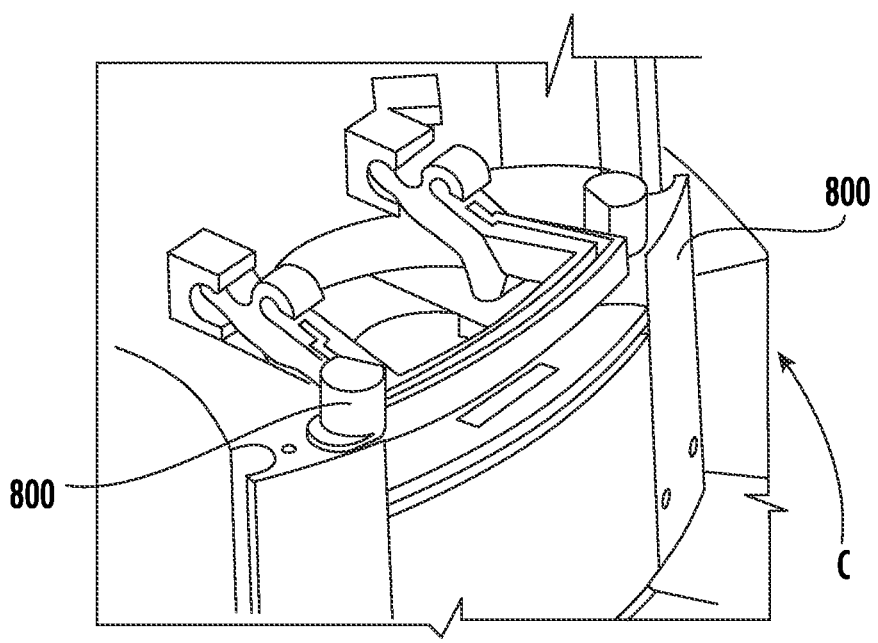

FIG. 17 shows how openings for the locking bolt 700 may be positioned within the closure section C. The closure section C includes bolt channels 860 configured to receive locking bolts 700, 800. Each channel is configured to be complimentary to its respective locking bolt. In preferred configurations, each channel is c-shaped and includes an elongated c-shaped section 862 and an open area 864 configured such that each locking bolt fits at least partially within each channel. FIG. 18 shows how prefixed within openings in the end cap, FIG. 18 with preinstalled bolts). After inserting the cable segment, the bolt will be turned by hand and the segment will be locked (FIG. 19) in fixed position. FIGS. 20 and 21 show another application using the bolt embodiment shown in FIG. 16.

Figure 22:
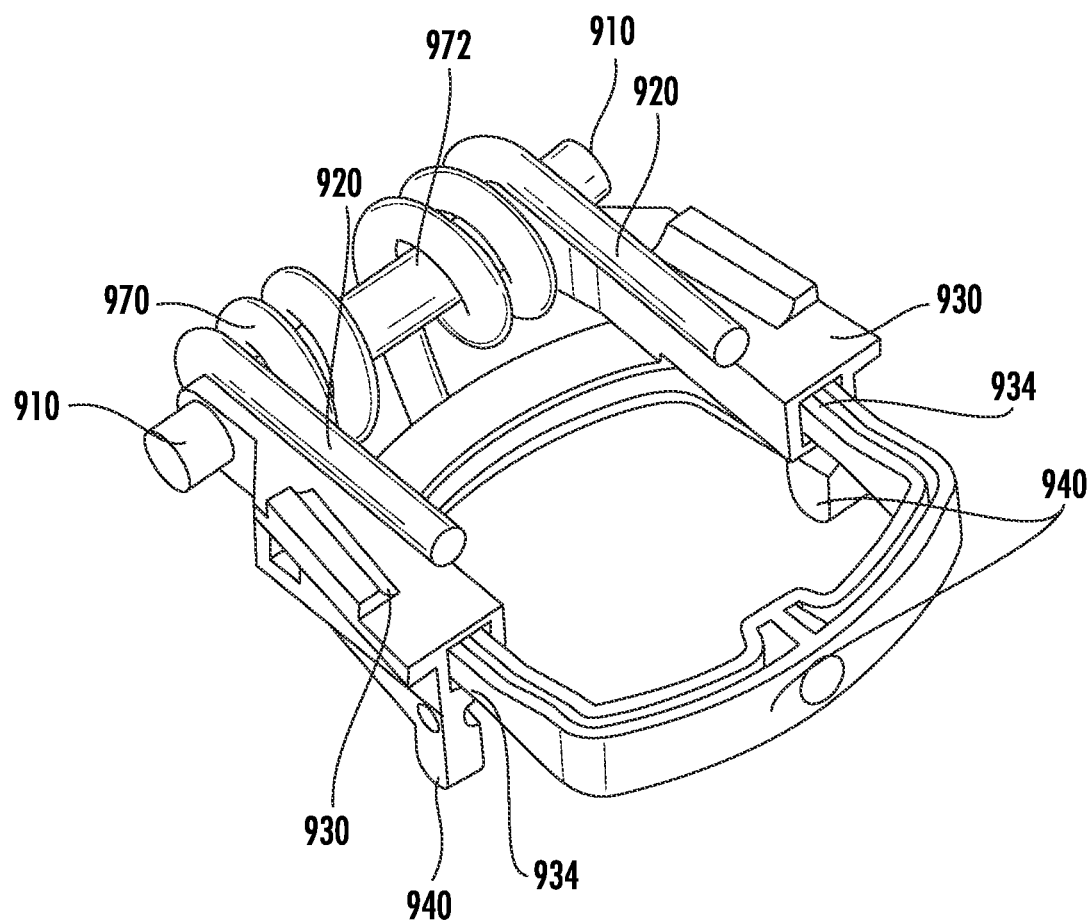
FIG. 22 shows an embodiment of a lever mechanism compression mechanism in accordance with embodiments disclosed herein.

FIG. 22 illustrates another embodiment of a lever mechanism 900, which can be integrated into various types of sealing systems and telecommunications closures. The lever mechanism 900 includes a torsion spring element 970, a shaft 972 routed through the torsion spring element, a plurality of hinge elements 910, a plurality of leveraging elements 920, a plurality of arm sections 930, having channels 934 disposed therein, a plurality of biasing elements 940, and a handle 950. Each hinge element 310 is used to mount the lever mechanism 300 onto a complementary component of closure. Such a component may be configured as an end cap or a central base plate of a closure. In this version of the lever mechanism, each arm section 930 is configured as a male-type section, which is insertable into the complementary female-type channel 934. The shape of the lever mechanism 900 is designed such that a force can be applied to activate the lever mechanism and bias each biasing element 340 against a complementary element positioned on a telecommunications closure. The particular geometry of the lever mechanism 900, shown in FIG. 22, has been chosen to apply the force needed to compress the lever mechanism and environmentally seal the closure.

Figure 23:
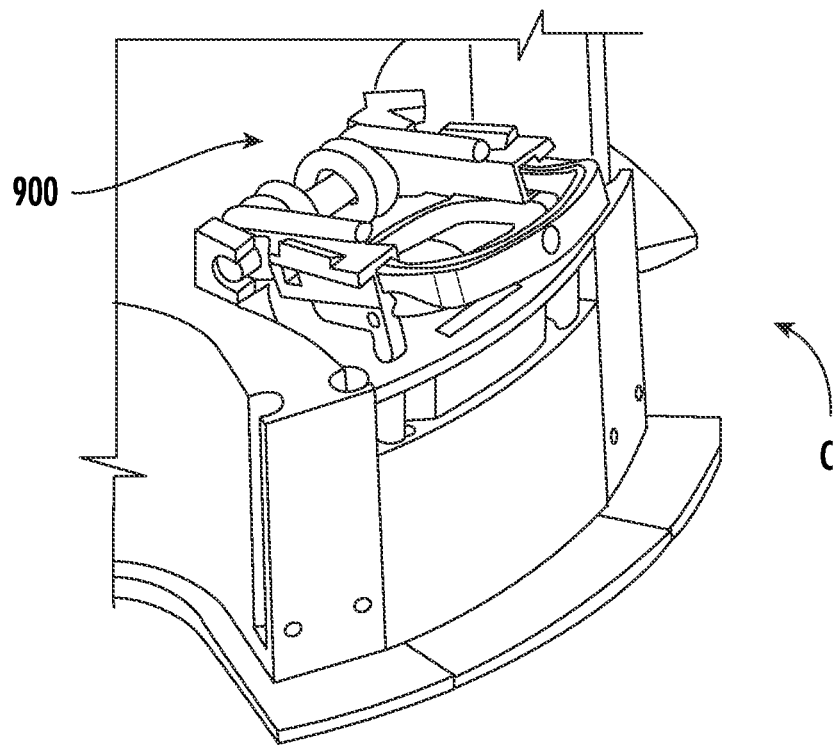
FIGS. 23 and 24 are isometric views of a portion of a closure, including the lever mechanism compression mechanism shown in FIG. 22.
Figure 24:
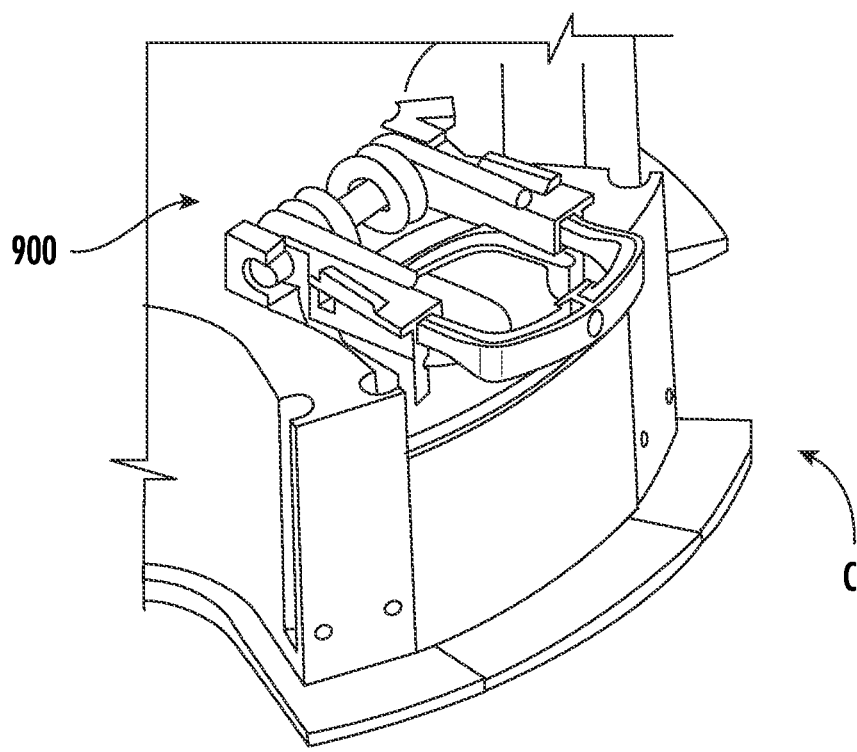

FIGS. 23 and 24 show positioning of the lever compression mechanism 900 into a portion of a closure section C. After releasing the lever mechanism 900 (release feature is not shown), the torsion spring element 970 will move the lever mechanism and compresses the cable seal within the cable segment. FIG. 24 shows the lever mechanism 900 in a final position. One advantage of this embodiment is that there is no need for an activation tool.

Figure 25:
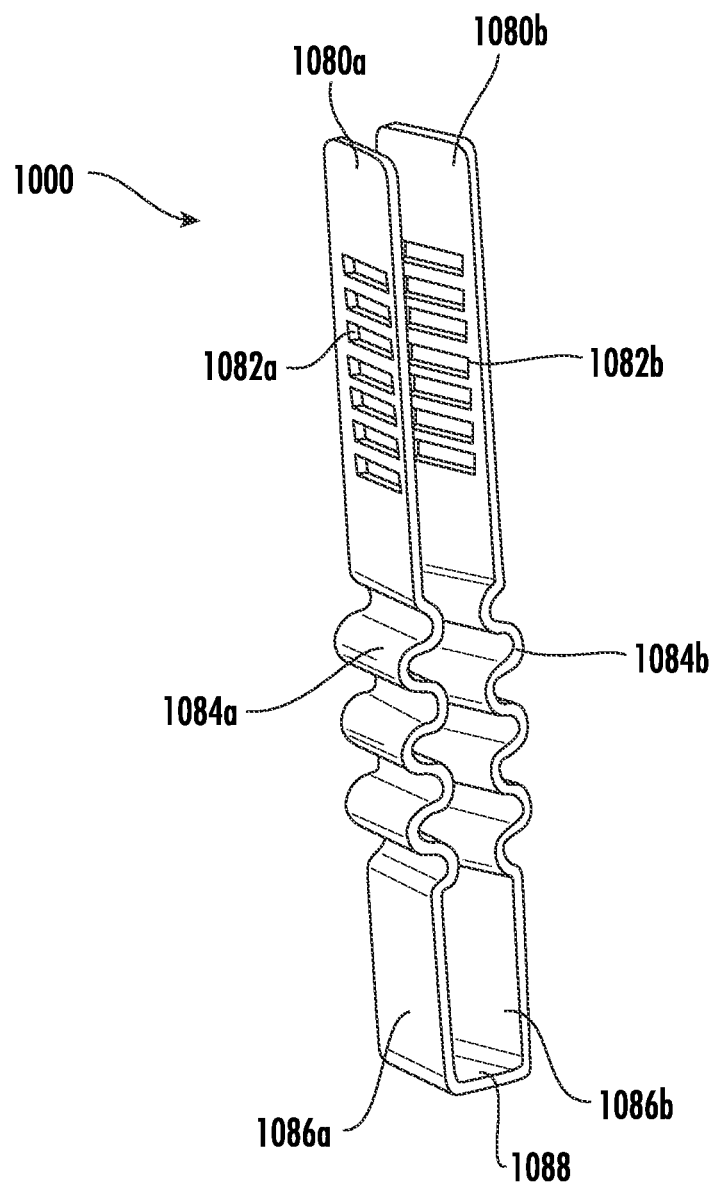
FIG. 25 is an isometric view of a spring element in accordance with embodiments disclosed herein.

FIG. 25 illustrates another method of securing a segment, using a spring-activated mechanism 1000 configured as a clip. The spring-activated mechanism includes upper ends 1080a, 1080b with slotted sections 1082a, 1082b, wave-shaped central portions 1084a, 1084b, and lower ends 1086a, 1086b connected by a bridge 1088. In each upper end is a slotted section 1082a, 1082b configured to mate with corresponding tangs or protruding elements 1090 on a closure section C.

Figure 26:
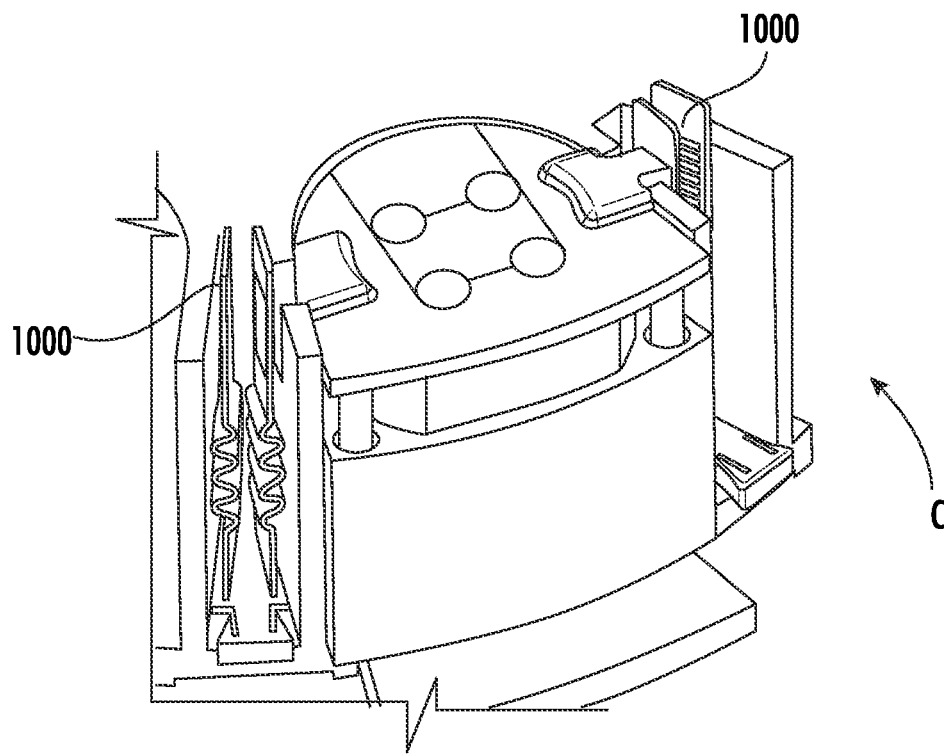
FIGS. 26 and 27 are isometric views of a portion of a closure, including the spring element shown in FIG. 25.
Figure 27:
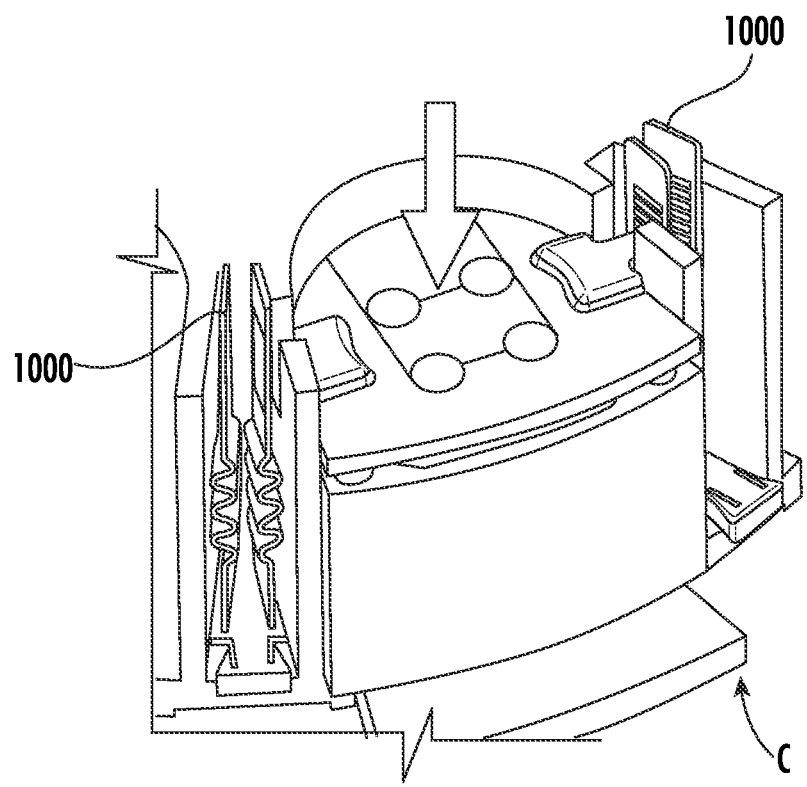
Figure 28:
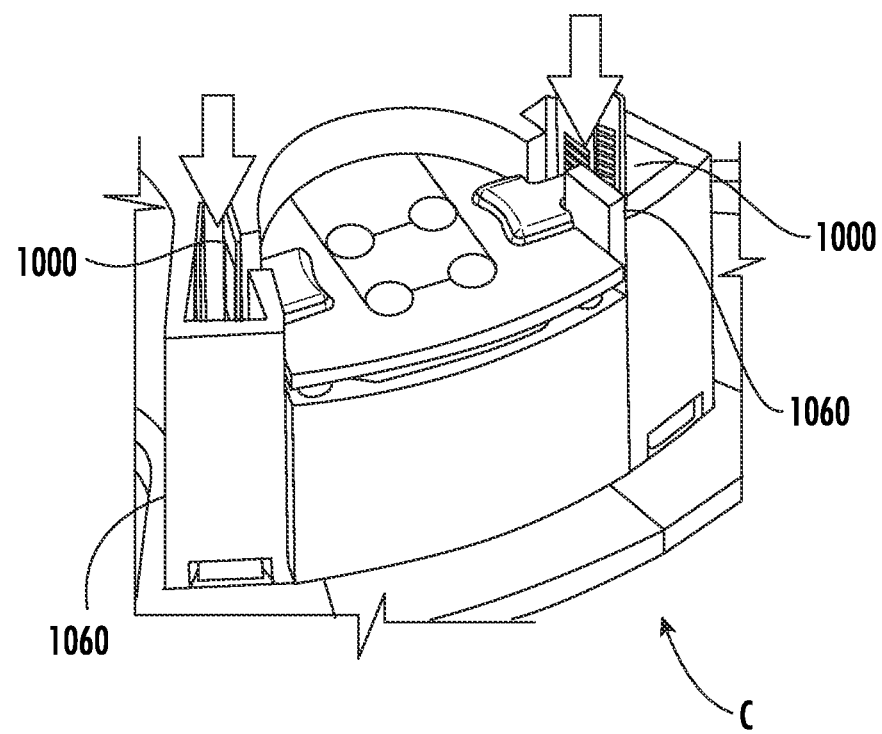
FIG. 28 is a detail view of the spring element shown in FIG. 25 with the spring element in an installed position.
Figure 29:
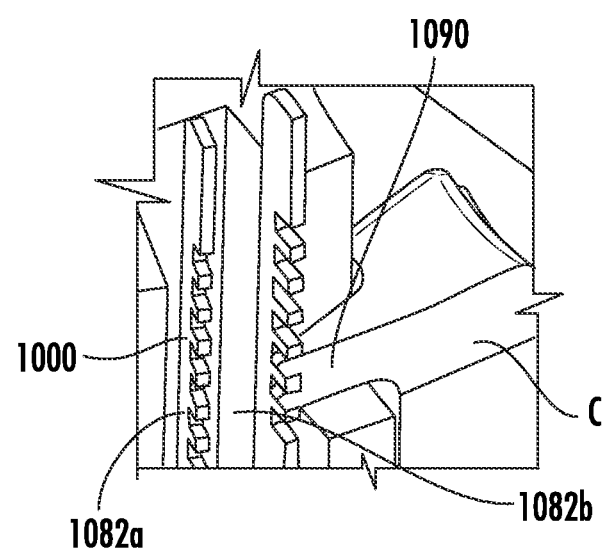
FIG. 29 is an isometric view of a portion of a closure, including the spring element shown in FIG. 25.

FIG. 26 shows how the spring-activated mechanism 1000 is positioned in channels 1060 before compression of the spring-activated mechanism. FIGS. 27 and 28 show how the spring-activated mechanism 1000 is positioned in the channels 1060 before compression of the spring-activated mechanism. FIG. 29 is a cross-sectional view of the spring-activated mechanism, illustrating how the corresponding tangs or protruding elements 1090 mate with the slotted sections 1082a, 1082b of the spring-activated mechanism 1000.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the embodiments disclosed herein should be construed to include everything within the scope of the appended claims and their equivalents.

The invention claimed is:

1. A lever mechanism for sealing a telecommunications closure, the lever mechanism comprising:
   a plurality of hinge elements;
   a leveraging element extending upwardly from each hinge element;
   an arm section extending from the leveraging element;
   a biasing element downwardly extending from the arm section; and
   a handle coupled to the biasing element such that upon application of a compressive force to at least a portion of the handle, the hinge element, the leveraging element, and the arm section, the biasing element moves, allowing the lever mechanism to change from a non-actuated position to an actuated position, wherein in the actuated position, the lever mechanism is configured to couple with a spring-activated element and environmentally seal the telecommunications closure.

2. The lever mechanism of claim 1, wherein the hinge element is configured as an insertable male-type hinge element configured for insertion into a complementary female-type receiving element disposed on the telecommunications closure.

3. The lever mechanism of claim 1, wherein the leveraging element curves upwardly and downwardly to form a c-shape.

4. The lever mechanism of claim 1, wherein the spring-activated element comprises a torsion spring.

5. The lever mechanism of claim 1, wherein the spring-activated element is configured as a clip.

6. The lever mechanism of claim 5, wherein the clip comprises at least two slotted sections configured to mate with a portion of the telecommunications closure.

7. A sealing system for a telecommunications closure, comprising:
   a lever mechanism, comprising a plurality of hinge elements;
   a leveraging element extending upwardly from each hinge element;
   an arm section extending from the leveraging element;
   a biasing element downwardly extending from the arm section;
   a handle coupled to the biasing element such that upon application of a compressive force to at least a portion of the handle, the hinge element, the leveraging element, and the arm section, the biasing element moves, allowing the lever mechanism to change from a non-actuated position to an actuated position, wherein in the actuated position, the lever mechanism is configured to couple with a spring-activated element and environmentally seal the telecommunications closure; and
   a spring-activated element coupled to the lever mechanism.

\* \* \* \* \*